(12) United States Patent
Tull

(10) Patent No.: US 6,441,848 B1
(45) Date of Patent: Aug. 27, 2002

(54) PREVENTING BLUR CAUSED BY MOTION OF THE SUBJECT IN A DIGITAL IMAGE

(76) Inventor: Damon L. Tull, 7798 Betsy La., Verona, WI (US) 53593

( * ) Notice: Subject to any disclaimer, the term of this patent is extended or adjusted under 35 U.S.C. 154(b) by 0 days.

(21) Appl. No.: 09/574,533

(22) Filed: May 19, 2000

(51) Int. Cl.[7] .......................... H04N 5/228; H04N 5/335
(52) U.S. Cl. ...................... 348/208; 348/241; 348/302; 348/308
(58) Field of Search ............................. 348/222, 241, 348/297, 302, 308, 294, 208

(56) References Cited

U.S. PATENT DOCUMENTS

| | | |
|---|---|---|
| 3,399,307 A | 8/1968 | Levin |
| 3,690,234 A | 9/1972 | Costianes |
| 3,829,870 A | 8/1974 | Ogoro et al. |
| 4,273,430 A | 6/1981 | Fritsche et al. |
| 4,320,948 A | 3/1982 | Hosoe et al. |
| 5,030,984 A | 7/1991 | Buckler et al. |
| 5,471,515 A | 11/1995 | Fossum et al. |
| 5,475,466 A | 12/1995 | Iwasaki et al. |
| 5,512,974 A | 4/1996 | Abe et al. |
| 5,623,708 A | 4/1997 | Watanabe |
| 5,649,241 A | 7/1997 | Watanabe |
| 5,692,118 A | 11/1997 | Yasukawa |
| 5,705,846 A | 1/1998 | Merrill |
| 5,739,856 A | 4/1998 | Watanabe |
| 5,793,322 A | 8/1998 | Fossume et al. |
| 5,800,691 A | 9/1998 | Kozulic |
| 5,841,126 A | 11/1998 | Fossum et al. |
| 5,886,659 A | 3/1999 | Pain et al. |
| 5,887,049 A | 3/1999 | Fossum |
| 5,900,623 A | 5/1999 | Tsang et al. |
| 5,909,026 A | 6/1999 | Zhou et al. |
| 5,915,133 A | 6/1999 | Hirai et al. |
| 5,930,532 A | 7/1999 | Matsumoto |
| 5,949,483 A | 9/1999 | Fossum et al. |
| 5,952,645 A | 9/1999 | Wang et al. |
| 5,962,844 A | 10/1999 | Merrill et al. |
| 5,990,506 A | 11/1999 | Fossum et al. |
| 5,995,163 A | 11/1999 | Fossum |
| 6,005,619 A | 12/1999 | Fossum |
| 6,021,172 A | 2/2000 | Fossum et al. |
| 6,043,478 A | 3/2000 | Wang |
| 6,043,690 A | 3/2000 | Krymski et al. |
| 6,049,247 A | 4/2000 | Krymski |

OTHER PUBLICATIONS

James H. Duncan and Tsai–Chia Chou, "On the Detection of Motion and the Computation of Optical Flow", Mar. 1992, IEEE Transactions on Pattern Analysis and Machine Intelligence vol. 14, No. 3, pp. 346–352.*

"Regularized Restoration of Partial–Response Distortions In Sporadically Degraded Images"—Damon L. Tull & Aggelos K. Katsaggeios—1998.

"CCD and CMOS Image Sensors"—http://www.shortcourses.com/book01/02–08.htm.

* cited by examiner

Primary Examiner—Wendy R. Garber
Assistant Examiner—Jacqueline Wilson
(74) Attorney, Agent, or Firm—Lathrop & Clark LLP

(57) ABSTRACT

A digital camera has a sensor array which removes subject motion blur by monitoring the rate at which charge is collected by the individual sensors within the array during scene imaging. If the rate at which photons are striking the sensor varies, then the brightness of the image which the sensor is viewing must be changing. When a circuit built in to the sensor array detects that the image brightness is changing, the amount of charge collected is preserved and the time at which brightness change wag detected is recorded. Each pixel corresponding to each sensor where exposure was stopped is adjusted to the proper exposure by linearly extrapolating the exposure the sensor did receive so that the pixel corresponding to the sensor has an intensity corresponding to the dynamic range of the entire image. The image sensing array will preferably be implemented as active-pixel sensor CMOS image sensors.

14 Claims, 3 Drawing Sheets

Fig. 6

PREVENTING BLUR CAUSED BY MOTION OF THE SUBJECT IN A DIGITAL IMAGE

CROSS REFERENCES TO RELATED APPLICATIONS

STATEMENT AS TO RIGHTS TO INVENTIONS MADE UNDER FEDERALLY SPONSORED RESEARCH AND DEVELOPMENT

BACKGROUND OF THE INVENTION

The present invention relates to the capture of digital images by means of a sensor array in general, and in particular to techniques for preventing blur in the captured image caused by movement of the subject during the digital exposure.

Digital photography appears likely to gain considerable market share from conventional 35 mm photography. This is particularly true for the nonprofessional photographer taking snapshots of family, friends, and vacations. The resolution of digital cameras is rapidly approaching the effective resolution of conventional 35 mm snapshots. Digital photography provides the convenience of being able to preview pictures immediately after they are taken, combined with the ability to email the images, or post the images on a web page.

Digital photography is also finding increasing use in business and commerce. Instantaneous turnaround and the simplicity with which digital images can be incorporated into electronic documents, as well as software used for producing newspapers and trade magazines, means that many weekly newspapers, real estate agents, catalog companies, and other businesses, are moving to digital photography to record images.

Conceptually, the digital camera hag many similarities to the camera used in conventional film photography. A camera lens projects an image onto a sensor array which replaces the conventional light sensitive photographic film. The camera lens may use conventional focusing techniques. An aperture stop maybe used to adjust the focal length ratio or f number of the lens. A shutter is used to control the length of exposure, and a flash may be used to replace or supplement ambient light. All these components are similar to those used in a conventional film-based camera, the differences being related to the particular attributes unique to the digital sensor which records the image.

Both digital photography and conventional film-based photography sense and record information about the relative number of photons which each part of the image receives from the actual scene being imaged by way of the lens. Conventional film-based photography employs a light-sensitive chemical, typically a silver halide, which is chemically activated by the absorption of several photons of light. Silver halide crystals which have been activated are then developed with chemistry to form an image. The more light that strikes a particular portion of the film, the more halide crystals which are activated, the darker the resulting image upon development.

The resolution of film-based photography depends on the size of the individual silver halide grains which form the emulsion deposited on the surface of the film. There is typically a trade-off between film resolution and film sensitivity to light. Greater sensitivity to light is advantageous because a shorter exposure can be used to form an image. Modem photographic emulsions are relatively efficient detecting perhaps 20 to 30 percent of the photons which impact the film.

For conventional film-based cameras, image quality depends on film selection, the mechanical and optical qualities of the camera and properly focusing the image on the film plane and properly timing the exposure.

Digital photography relies on a sensor array, with each sensor within the array corresponding to the minimum resolution element, or pixel in the final image. A digital camera typically has one million to a few million sensors arranged in a rectangular array. The sensor arrays are microelectronic devices formed on a silicon-based chip, or other semiconductor substrate. The devices are built utilizing conventional semiconductor device fabrication techniques, such as vapor deposition, ion implantation, application of photoresist followed by etching, etc. A typical sensor is a semiconductor device which captures electrical charge within a potential well, the electrical charge being proportional to the number of photons absorbed by the semiconductor device.

After the sensor array has been exposed to light, the amount of electrical charge in each sensor potential well within the array is measured and converted by an A/D converter to a digital value. The semiconductor devices making up a digital array have quantum efficiencies, i.e. the percentage photons detected, which may be as high as around 60 percent. Unlike photographic emulsion, where each individual silver halide crystal is either activated or not, each semiconductor sensor within the array can have between 0 and several thousand electron pairs. Thus each sensor within the array has a much larger dynamic range than the crystals making up a photographic emulsion, which are basically bipolar.

An approximation of the ideal exposure for forming an image on any sensor array is an exposure in which the brightest part of the image just saturates the array sensors. In this way the fall dynamic range of the sensor array is utilized. However, because the dynamic range of the typical semiconductor sensor array is so much greater than film, an acceptable image can be acquired with an exposure which only utilizes a fraction of the dynamic range of the sensors. Nevertheless, in conventional digital photography it is desirable to use the full dynamic range of the sensor array both to allow later adjustments in dynamic range and to overcome the problem of noise. Extraneous electrical charge which accumulates within individual sensors due to thermal noise and other factors within the microelectronic devices is more of a problem with a sensor which has accumulated only a small number of photons.

Beyond obtaining a digital image, the digital camera still functions much like a conventional film-based camera in capturing an image. What is needed is a digital camera which provides new functionality based on the inherent properties which the new technology brings to image capture.

SUMMARY OF THE INVENTION

The digital camera of this invention utilizes a sensor array which is capable of removing blurring from an image caused by motion of the imaged subject. This is accomplished by monitoring the rate at which charge is collected by the individual sensors within the array while a scene is being imaged. If the rate at which photons are striking the sensor varies, then the brightness of the image which the sensor is viewing must be changing. Changing image brightness implies that the object being imaged is moving. When a circuit built into the sensor array detects that the image brightness is changing, the amount of charge collected is preserved, and the time at which motion was detected is recorded. The amount of charge collected may be preserved by closing an optical shutter such as a liquid crystal shutter in front of a particular sensor, or by transferring the charge to a storage location. When an exposure is complete, portions of the image where no motion was detected have a normal dynamic range of image intensity. Those portions of the image where motion was detected—and thus where exposure was stopped before exposure was complete—have a reduced dynamic range. Each pixel corresponding to each sensor where exposure was stopped is adjusted to the proper exposure by linearly extrapolating the exposure the sensor did receive, so that the pixel corresponding to that sensor has an intensity corresponding to the dynamic range of the entire image. Thus, for example, with a particular sensor which was exposed for only one-tenth of the total exposure time before motion was detected, the value corresponding to the sensor will be multiplied by a factor of ten.

The effect of motion within a scene being imaged with a conventional digital or film-based camera is blurring of the object which moved and the obscuring of that portion of the image over which the moving object passes. With a digital camera of this invention the effect of motion of the object during an exposure is simply to reduce the dynamic range and to increase slightly the noise associated with the object which moved and a portion of the image which was obscured by the moving object. The effect of decreased dynamic range and increased image noise are much less apparent than blur caused by motion.

The image sensing array will preferably be implemented in CMOS as active-pixel sensors. The CMOS technology provides lower cost, and allows cost-effective implementation of additional on-chip circuitry necessary to implement the motion detection, and blur elimination functions.

It is an object of the present invention to provide a digital camera which removes blur caused by motion of the subject.

It is another object of the present invention to provide a digital camera which, during a single exposure can capture both the blurred and the preblurred image.

It is a further object of the present invention to provide a digital camera with reduced blur under low light conditions.

It is a yet further object of the present invention to provide a low-cost digital sensor for digital cameras which incorporates subject motion blur prevention.

Further objects, features and advantages of the invention will be apparent from the following detailed description when taken in conjunction with the accompanying drawings.

BRIEF DESCRIPTION OF THE DRAWINGS

FIG. 6 is a schematic view of the voltage recorded by individual photodiode sensors employed in the sensor array of this invention.

DESCRIPTION OF THE PREFERRED EMBODIMENTS

Figure 1:
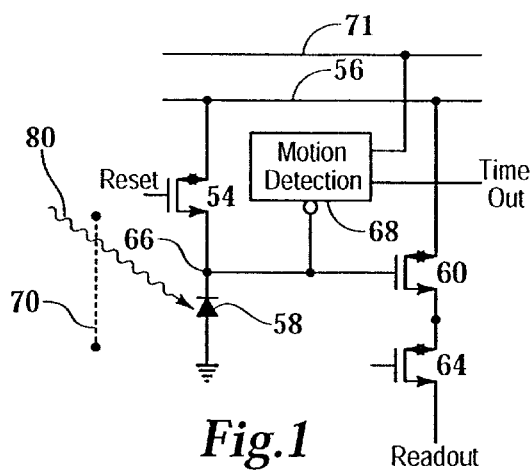
FIG. 1 is a circuit diagram of a portion of the photodiode array of this invention.
Figure 2:
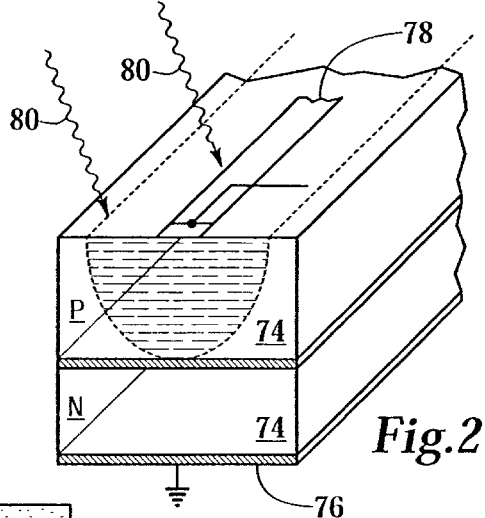
FIG. 2 is a schematic isometric view of the photodiode of FIG. 1.
Figure 3:
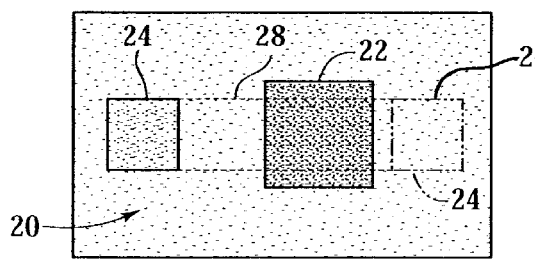
FIG. 3 is a schematic view of a scene having moving elements that are captured by a digital camera.
Figure 4:
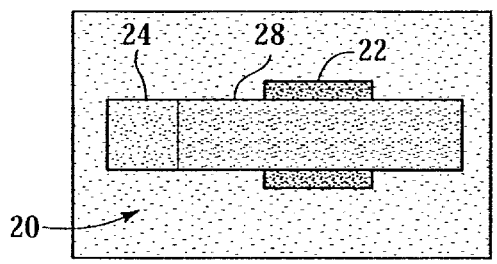
FIG. 4 is the image obtained by a conventional digital camera of the scene of FIG. 3.

Referring more particularly to FIGS. 1–6 wherein like numbers refer to similar parts, a scene 20 which is the subject of a photograph is shown in FIG. 3. Within the scene 20 is a large square 22 which remains motionless during digital imaging of the scene. A second smaller square 24 is motionless during the first 10 percent of the exposure but then moves with constant velocity across the large square 22 to a position 26 along the path 28 as shown in FIG. 3. FIG. 4 depicts the scene of FIG. 3 as it would be recorded by a conventional digital camera or film. The image of the smaller square 24 is blurred across the image of FIG. 4 as shown by the path 28 in FIG. 4.

Figure 5:
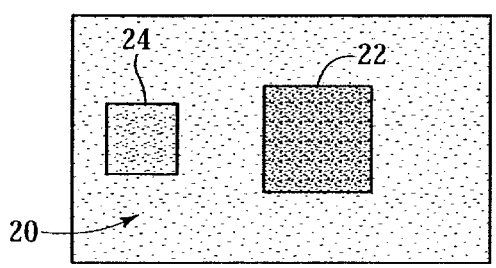
FIG. 5 is the digital image obtained by a digital camera employing the apparatus and method of this invention of the scene of FIG. 3.
Figure 6:
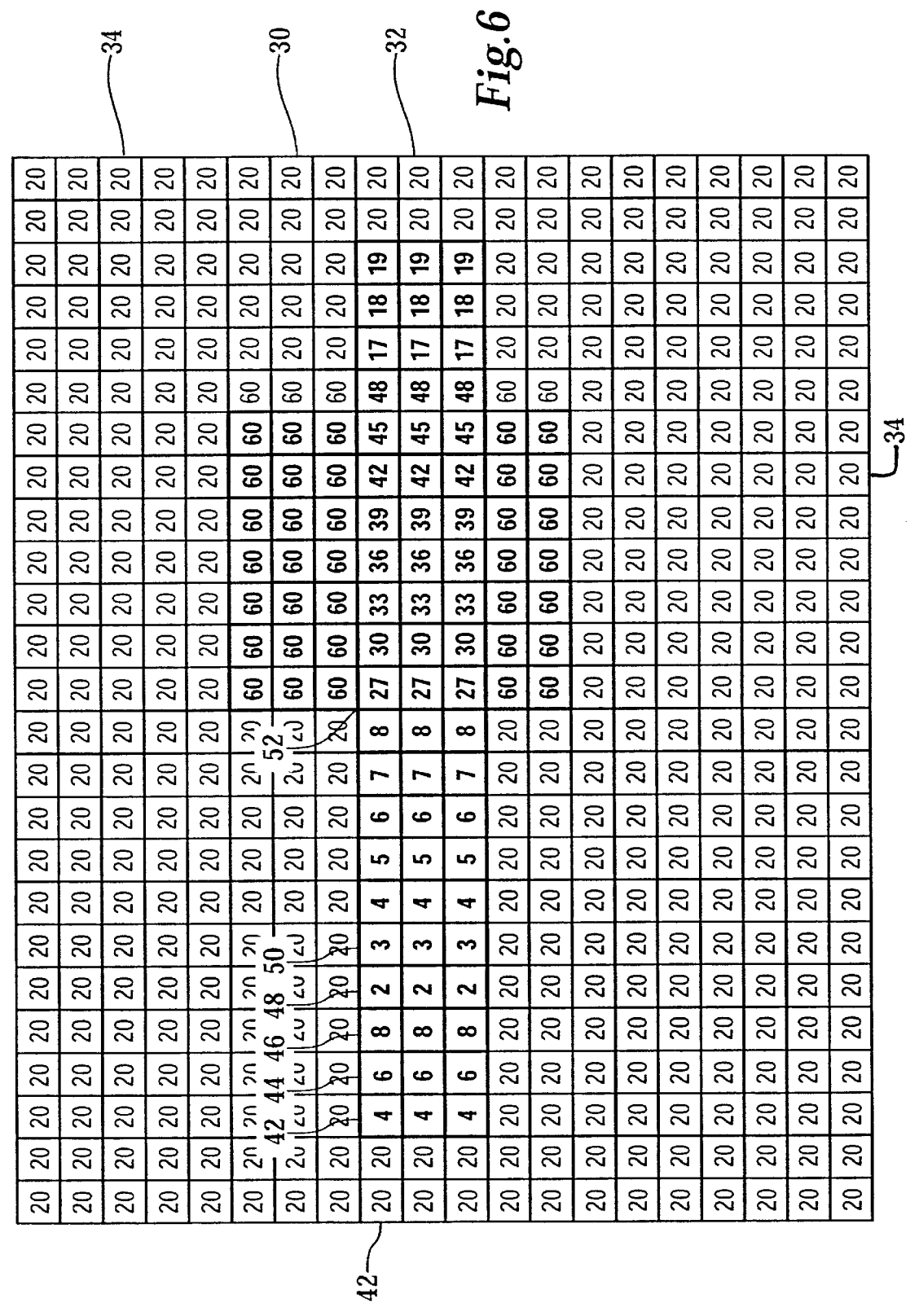

The desired image, as depicted in FIG. 5, shows the scene 20 of FIG. 3 with the blur caused by the motion of the small square 24 removed. The mechanism of blur prevention is accomplished at the level of the individual photosensor 30 in a photosensor array 32. FIG. 6 is a schematic representation of a photosensor array 32 which contains twenty by twenty-five sensors 30 arranged in a rectangular array containing five hundred sensors 30. Each sensor 30 within the array corresponds to a single picture element or pixel 34.

Figure 7:
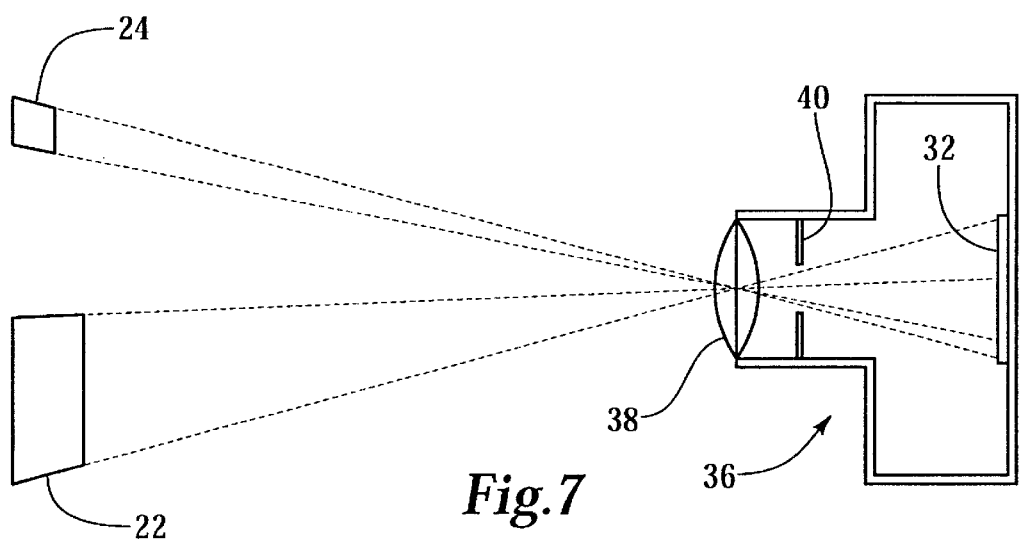
FIG. 7 is a pictorial view of a digital camera forming an image of the scene depicted in FIG. 3.

A digital camera 36, as shown in FIG. 7, has a lens 38 which projects an image of the scene 20 through a shutter 40 onto the sensor array 32. The shutter 40 may be electronic or mechanical. The sensor array 32 contains sensors 30 which are capable of detecting the arrival of individual photons from discrete portions of the scene 20. In a conventional digital camera the individual sensors accumulate electric charge which is proportional to the number of photons received by a particular sensor during the entire length of time during which the image is projected onto the sensor array. For each pixel, the number of photons or the electrical charge accumulated during the exposure is then measured as a voltage which is converted by an A/D converter to a digital value which corresponds to the number of photons falling upon a particular sensor. The number of photons then is correlated to a brightness in the final image of a particular pixel.

Motion of an object such as the small square 24 during the exposure can be detected by monitoring the second derivative of the charge accumulating on the sensor with respect to time. The first derivative of charge accumulating on the sensor with respect to time represents the rate at which photons are being detected, and electrical charge is being accumulated on the sensor. The second derivative of charge accumulation with respect to time represents the rate of change in the rate of charge accumulation on the sensor. If the brightness of the object being imaged onto a particular photosensor remains Constant, then the rate of buildup of charge accumulating on the sensor will remain constant, and thus the second derivative of charge accumulation with respect to time will be zero. A nonzero value for the second derivative of charge accumulation on a particular sensor means that the brightness of the portion of the image which a particular sensor is monitoring is changing. Where a portion of the image is changing in brightness it can reliably be presumed that the change in brightness is due to motion of the object being imaged. The only other sources of change in object brightness would be a change in illumination of the object. Change in illumination of the object is unlikely in the 1/10 to one hundredth of a second during which a typical image is captured.

Once motion is detected on a particular sensor, the effect of that motion can be eliminated by storing two values, one corresponding to the time, as a percentage of the total exposure, at which motion is detected, and another value corresponding to lie amount of light received by the sensor before motion was detected. Then, during or after read out of the voltage corresponding to each sensor, the voltage values for those particular sensors for which motion was detected are replaced by calculated values based on a linear extrapolation of the light received by each particular sensor before motion was detected.

FIG. 6 depicts the values corresponding to each sensor of an array 32 where motion detection is performed at the individual sensor level, after the array has been exposed to the scene 20 shown in FIG. 3. In FIG. 6 the value assigned to each pixel 34 is the value recorded by the sensor at the point in time when motion was detected with respect to a particular pixel 34, or, if no motion was detected at a particular sensor, the pixel value corresponds to a final value of integration during the exposure. The numbers represent the brightness of an object in percent compared to the maximum brightness which the sensor array 32 can record. The large square 22 has a surface brightness of sixty, the small square 24 has a surface brightness of forty, and the background has a surface brightness of twenty.

In the scene depicted in FIG. 3 no motion occurs during the first 10 percent of the exposure. Then the small square 24 begins to move at a uniform rate towards the large square 22. The rate of motion of the small square 24 is sufficient to move one pixel, i.e. one sensor, towards the large square 22 during each additional five percent of the exposure until the exposure is completed. In the final image depicted in FIG. 5, a value assigned to every pixel corresponding to the background should be twenty, the value assigned to every pixel corresponding to the small square 24 should be forty and corresponding to the large square 22 should be sixty. The values actually recorded as depicted in FIG. 6 therefore require correction by linearly extrapolating to correct for the fact that integration of the exposure by a particular sensor was stopped as a result of motion detection.

The individual pixels 42 which have a value of 4 represent those sensors which imaged the small square 24 for ten percent of the exposure before the small square 24 began moving to the right, exposing the background and causing the accumulation of charge to be stopped in response to the detected motion. To linearly extrapolate the exposure to that which would have been recorded had no motion occurred, the value actually recorded is divided by the percent of the total exposure to give the value of 40. The pixels in the next column 44 have a value of 6 because motion was not detected until fifteen percent of the exposure was complete, the fifteen percent representing ten percent before motion occurred and five percent when motion occurred, but no change in brightness occurred because the small square 24 is assumed to have uniform brightness. The value of 6 is divided by fifteen percent to obtain a value of forty which represents the value which the square would have recorded if no motion had occurred. A third column of pixels 46 has values of 8 because motion is not detected until twenty percent of the exposure is complete. The value 8 is divided by twenty percent, again producing a value of 40.

A fourth column of pixels 48 representing the background which is covered by the advancing small square 24 and which has received ten percent of the exposure at the background rate results in a value of 2. The value 2 is divided by ten percent resulting in a value of 20 for the pixels 48. As the small square advances across the background, the value at which the background pixels accumulate before the small square moves in front of them increases while the percentage of the exposure to which the background pixels have been exposed also increases. Thus the column of pixels 50 just in front of the large square 22 have a value of 8 and have an exposure amounting to forty percent of total exposure. Eight divided by forty percent, again, is the background level of 20.

As the small square 24 passes over the larger square 22, the first column of pixels 52 which is shadowed by the small square 24 has a value of 27 and an exposure corresponding to forty-five percent of the total exposure, to give a surface brightness of 60. In similar fashion, every sensor where motion is detected stops accumulating photons and is normalized to adjust the detected exposure to an equivalent exposure corresponding to the length of the entire exposure. The result is as depicted in FIG. 5, where all the effects of motion have been eliminated, thereby eliminating the blurring caused by motion of the small square 24.

Of course the prevention of blur caused by motion of the subject being photographed is not lossless. The shorter integration period associated with detecting and eliminating blur results in a reduction in the dynamic range, and an increase in the effects of noise on the signal recorded. These effects will be more noticeable on uniformly illuminated large surfaces but are inherently present wherever blurring has been prevented. However, these slight causes of image deterioration are much less noticeable and much less aesthetically objectionable as compared to image blurring.

While the concept for removing image blur could be implemented in a number of technologies, including for example a CCD array, the need for additional onboard processing will most effectively be incorporated into the integrated chip if technology which makes use of CMOS foundries is employed. Thus a preferred embodiment such as illustrated in FIG. 1 and FIG. 2 is an active-pixel sensor which can combine ease of fabrication with circuitry at each pixel that determines the pixel's noise level and cancels it out. The performance of the active-pixel sensor technology is comparable to many charge-coupled devices and can be used to construct larger image arrays with higher resolution.

FIG. 1 illustrates a circuit diagram of an active pixel sensor. In FIG. 1 the drain of a NMOS transistor 54 is connected to a constant voltage source 56, the source of the NMOS transistor 54 is connected to the cathode of a photodiode 58 and the anode of the photodiode 58 is coupled to ground.

The drain of a second NMOS transistor 60 is coupled to the constant voltage source 56 and the source of the second transistor 60 is coupled to the drain of a third NMOS transistor 64. The gate of the second NMOS transistor 60 is coupled to the cathode of the photodiode 58.

The active pixel sensor depicted in FIG. 1 utilizes the photodiode 58 to sense light intensity and transforms it into electric signals, and then the electric signal is output from the source of the NMOS transistor 64. The operation of the active pixel sensor will be understood by those skilled in the art.

During a first time interval the NMOS transistor 64 is turned on by a signal applied to the gate of the transistor 64. During the first time interval the NMOS transistor 54 is not turned on, and the voltage at node 66 is amplified by the second NMOS transistor 60 and the third NMOS transistor 64, thereby obtaining a first voltage from the source of the third NMOS transistor 64. This first voltage represents noise. In a second time interval the first NMOS transistor 54 is turned on by a reset signal. A light-induced current is generated by the photodiode 58 and flows from the constant voltage source 56 through the first NMOS transistor 54 and the photodiode 58 to the ground, thereby charging the voltage at the node 66 to a second voltage. In a third time interval the first NMOS transistor 54 is turned off, and the second voltage at node 66 is amplified by the second and third NMOS transistors 60, 64 thereby obtaining a second voltage from terminal readout. The difference between the second voltage and the first voltage corresponds to the light intensity sensed by the photodiode 58.

A motion detection circuit 68 connected to monitor node 66 detects the voltage change with respect to time at the cathode of the photodiode 58. The motion detection circuitry 68 extracts the second derivative of the voltage at node 66 which is equivalent to determining whether the light flux to the diode 58 is changing. Changing light flux to the diode 58 indicates motion is occurring with respect to the pixel represented by the diode. When motion is detected, the motion detection circuitry 68 can be used to record a time, and to close a liquid crystal shutter 70 which prevents any additional light from reaching the photodiode 58. Time may be recorded by storing the voltage of a ramped voltage source 71. The voltage source 71 is supplied to the motion detection circuit 68 associated with each photodiode 58. The voltage source 71 constantly increases at a steady rate from the beginning of the exposure until the exposure is completed. The voltage obtained from the voltage source 71 at any instant corresponds to the percentage of the exposure which has elapsed. When motion is detected and the liquid crystal shutter 70 closed or the value at the node 66 is stored, the voltage of the source 71 is simultaneously stored.

The liquid crystal shutter 70 preserves the value obtained by the photodiode before motion was detected, so that the pre-motion value is then subsequently read out. This read out value corresponds to the values for pixels 42, 44, 46, 48, 50, 52 illustrated in FIG. 6 as discussed above. The value obtained for each pixel must be adjusted by dividing by the percentage of the total exposure which was recorded, by a particular photodiode 58, the percentage being represented by the value stored from the ramped voltage source 71.

The voltage corresponding to a time value may be read out for each photodiode 58 in the diode array. Alternatively the voltage value which has been recorded for each photodiode is adjusted by dividing by the percentage of the total exposure to which the photodiode was exposed.

A number of approaches can be used to collect the necessary information to prevent image blur due to subject motion. The voltage or charge can be transferred to a storage device at the end of the exposure, or sooner if motion is detected. At the end of the exposure the accumulated voltage charge can be sequentially read out for each photosensor 30. A parallel set of storage devices can be used to record the voltage 71, which records the time at which the voltage corresponding to a particular photosensor is recorded.

When the liquid crystal shutter 70 forms part of a liquid crystal shutter array (not shown) the activation of the liquid crystal could be used to record the time when the shutter was closed.

Is also possible for the motion detection circuitry 68 to simply perform the calculation necessary to determine the linear extrapolation of the value of the pixel in question and to supply this voltage directly to the readout so that the motion detection and blur prevention would occur at the individual sensory level within the sensor array.

Because a small amount of noise maybe present within the photodiode 58, where the total charge and thus voltage on the photodiode is small, noise may make the voltage at the node 66 appear to have a nonzero second derivative. Thus it may be desirable that the condition for the detection of motion include a decreasing offset which takes into account the effect of noise on the total detected light received by the photodiode.

Thus the nominal condition for detecting motion with respect to a particular pixel is that the second derivative is nonzero, that is that the rate at which photons are being captured or collected by the individual sensor, is changing. But in a practical device, noise must be accounted for, especially near the beginning of the integration period, when the random nature of noise, and the statistical nature of light may make the rate of collection of photons appear to vary.

FIG. 2 shows a CMOS photodiode 58 composed of P type material 72 joined to underlying N type material 74 which in turn is connected to ground 76. A voltage is supplied by a conducting strip 78 through which a voltage is applied to the P type material. Photons 80 penetrating the P type material create electron pairs and hole pairs, the hole pairs migrate to ground, leaving electron pairs which reduce the voltage at the conducting strips 78 which in turn is monitored at the node 66 of FIG. 1.

Where an array of photosensors is used to collect video or motion pictures, the blurring effect caused by motion of the subject provides important clues to the brain. These clues make viewing the moving images easier. Thus where a single camera will be used to capture both moving images and stills, it is useful to collect both images with blur, and images without blur. In this way if a single frame of a video is desired it may be shown without blur. This can be accomplished by having the motion detection circuit monitor and record the voltage at the node 66 at the time when motion is detected, but otherwise not interfere with the total value for light collected by the photodiode 58. The results of the motion detection circuit will then be added off chip when it is desirable to construct an unblurred frame.

It should be understood that the implementation of the blur prevention technique may include various device level solutions which could be implemented in CMOS or in other fabrication systems such as those employed with CCD arrays. Further, with CMOS implementation the charge stored by the photodiode 58 may be moved to an intermediate charge storage region which is subsequently read out alone or together with the blur part of the image which is collected subsequent to the detection of blur.

It should be understood that conceptually the photoarray with blur prevention capabilities may be thought of as a light-sensitive array combined with an adjustable mask which is used to shield portions of the photoarray from portions of the image which are in motion. The mask and photoarray are further combined with a system of selective enhancement of image intensity, required to compensate for the effects of the adjustable mask.

It should be understood that in order to record color, or for other reasons, a particular pixel in an image formed as a result of the digital camera may utilize information gathered from a number of actual sensors. On the other hand, if a digital zoom feature is used, a single sensor may correspond to a plurality of pixels in the digital image recorded. A one-to-one correspondence between pixel elements and sensors is herein defined to exist so long as a definite correlation exists between particular sensors and particular pixels of the digital image.

It is understood that the invention is not limited to the particular construction and arrangement of parts herein illustrated and described, but embraces such modified forms thereof as come within the scope of the following claims.

I claim:

1. A digital camera incorporating circuitry for prevention of blur caused by motion of a photographic subject, comprising:
   a multiplicity of photosensors arranged in an imaging array, each photosensor developing a first value proportional to the number of photons received by said sensor;
   a photographic lens which projects an image onto the imaging array, wherein each photosensor in the imaging array is operatively connected to a circuit which is capable of calculating a second derivative with respect to time of the first value proportional to the number of photons received by said sensor; and
   a programmable memory operatively connected to each circuit to store at least one time value for each photosensor corresponding to a length of exposure time for each photosensor, the length of exposure time for each photosensor connected to each circuit determined by the second derivative of the first value meeting a selected criteria which indicates movement was detected.

2. The digital camera of claim 1 wherein the first value is a voltage and each of the photosensors is a photodiode.

3. The digital camera of claim 1 further comprising a liquid crystal shutter in front of each of the multiplicity of photosensors.

4. The digital camera of claim 1 wherein the photosensors are based on CMOS technology.

5. The digital camera of claim 4 where in the photosensors are active-pixel sensors.

6. A method of preventing image blur caused by motion of photographic subjects, comprising the steps of:
   forming an image on to an array of photosensors for a selected period of time;
   for each sensor during said selected period of time, monitoring at least one value proportional to the rate at which photons are striking the sensor and calculating a second derivative of the at least one value;
   for each sensor during said selected period of time, computing a second derivative of the at least one value, and comparing the second derivative with a criteria for determining motion; and
   for each sensor during said selected period of time, upon the condition that motion is detected, because the second derivative meets the criteria for determining motion, recording a second value corresponding to the percentage of the selected period of time which has elapsed, and recording the at least one value.

7. The method of claim 6 wherein the step of recording the at least one value comprises closing a liquid crystal shutter so as to preserve the at least one value from change by the incidence of light on said sensor.

8. The method of claim 6 wherein the second value is a voltage which is linearly increasing during the exposure.

9. The method of claim 6 further comprising the step of forming a processed image, wherein each pixel making up the image corresponds to a sensor in the array, and the step of forming the processed image comprises:
   where motion was not detected at a sensor, assigning a value to each pixel which is proportional to the light detected by each sensor; and
   where motion was detected with respect to a particular sensor assigning a value equal to the recording of the at least one value divided by the percentage of the exposure which has elapsed.

10. A method of preventing image blur caused by motion of photographic subjects, comprising the steps of:
    forming an image on to an array of photosensors for a selected period of time;
    for each sensor during said selected period of time, monitoring a photon collection rate for the sensor;
    for each sensor upon the condition that the photon collection rate varies more than a selected amount, recording a first value proportional to photons collected and recording a second value proportional to the percentage of the selected time which has elapsed; and
    for each sensor wherein the photon collection rate does not vary more than a selected amount recording a third value proportional to the photons collected during the entire selected period of time.

11. The method of claim 10 further comprising the step of creating an image in a storage medium, composed of a multiplicity of pixels, each pixel having a one-to-one correspondence with a sensor in the sensor array, wherein when the sensor corresponding to a particular pixel has a first and second value recorded with respect thereto, assigning the particular pixel a value proportional to the first value divided by the second value, and when a particular pixel has a third value recorded with respect thereto assigning the particular pixel a value proportional to the third value.

12. The method of claim 11 wherein the step of recording the first value comprises closing a liquid crystal shutter so the photons collected by the photosensor form a record of the first value.

13. The method of claim 11 further comprising the step of, for each sensor which met the condition that the photon collection rate varies more than a selected amount, and for which the first value and the second value were recorded, recording a fourth value proportional to the photons collected during the entire selected period of time.

14. The method of claim 13 further comprising recording a multiplicity of sequential images to form a movie, storing the movie in a storage medium so that when viewed as a motion picture blur is not removed from individual images, but when viewed as a still, blur is removed from each frame.

* * * * *